United States Patent

Kim et al.

[11] Patent Number: 5,990,978
[45] Date of Patent: Nov. 23, 1999

[54] LUMINANCE/CHROMINANCE SIGNAL SEPARATING DEVICE

[75] Inventors: Joo Won Kim; Woo Jin Song, both of Kyoungsangbuk-Do, Rep. of Korea

[73] Assignee: LG Electronics Inc., Seoul, Rep. of Korea

[21] Appl. No.: 08/822,342

[22] Filed: Mar. 20, 1997

[30] Foreign Application Priority Data

Mar. 23, 1996 [KR] Rep. of Korea .......................... 96-8050

[51] Int. Cl.⁶ .......................................................... H04N 9/78
[52] U.S. Cl. .......................... 348/663; 348/699; 348/670; 348/665
[58] Field of Search .................................... 348/669, 668, 348/667, 670, 663, 665, 700, 908; H04N 9/78

[56] References Cited

U.S. PATENT DOCUMENTS

| | | | |
|---|---|---|---|
| 4,107,736 | 8/1978 | Lowry et al. | 348/621 |
| 4,498,100 | 2/1985 | Bunting et al. | 348/666 |
| 4,608,594 | 8/1986 | Nicholson | 348/451 |
| 4,646,138 | 2/1987 | Willis | 348/621 |
| 4,692,801 | 9/1987 | Ninomiya et al. | 348/425 |
| 4,853,765 | 8/1989 | Katsumata et al. | 348/451 |
| 4,881,125 | 11/1989 | Krause | 348/448 |
| 4,882,625 | 11/1989 | Akiyama | 348/451 |
| 4,951,129 | 8/1990 | Lang | 348/610 |
| 5,117,287 | 5/1992 | Koike et al. | 348/402 |
| 5,144,427 | 9/1992 | Kitaura et al. | 348/402 |
| 5,155,582 | 10/1992 | Tokoi et al. | 348/663 |
| 5,161,030 | 11/1992 | Song | 386/9 |
| 5,177,609 | 1/1993 | Kawakami et al. | 348/445 |
| 5,202,755 | 4/1993 | Yang et al. | 348/388 |
| 5,206,723 | 4/1993 | Parke | 348/416 |
| 5,233,421 | 8/1993 | Chrisopher | 348/571 |
| 5,235,421 | 8/1993 | Yang | 348/426 |
| 5,285,266 | 2/1994 | Jo | 348/665 |
| 5,311,306 | 5/1994 | Tanaka et al. | 348/702 |
| 5,353,118 | 10/1994 | Cho | 348/451 |
| 5,389,965 | 2/1995 | Kuzma | 348/14 |
| 5,412,436 | 5/1995 | Christopher | 348/700 |
| 5,430,487 | 7/1995 | Naimpally | 348/429 |
| 5,469,227 | 11/1995 | Misker et al. | 348/702 |
| 5,473,389 | 12/1995 | Eto et al. | 348/669 |
| 5,502,509 | 3/1996 | Kurashita et al. | 348/669 |
| 5,526,054 | 6/1996 | Greenfield et al. | 348/467 |
| 5,579,054 | 11/1996 | Sezan et al. | 348/452 |
| 5,585,861 | 12/1996 | Taniguchi et al. | 348/669 |
| 5,589,888 | 12/1996 | Iwasaki | 348/669 |
| 5,737,020 | 4/1998 | Hall et al. | 348/403 |

FOREIGN PATENT DOCUMENTS

WO 90/13979  11/1990  WIPO .

OTHER PUBLICATIONS

Derwent, Luminance-Chrominance Signal Separating Device for HDTV, Derwent Jan. 1997–438178.

Primary Examiner—John K. Peng
Assistant Examiner—Jean W. Désir
Attorney, Agent, or Firm—Oppenheimer Wolff & Donnelly LLP

[57] ABSTRACT

A luminance/chrominance (Y/C) signal separating device utilizing motion estimation and compensation. According to the device, the image motion is detected in the unit of a 2×2 (sample×line) block to separate an NTSC television signal into the Y and C signals. As a result of the motion detection, a three-dimensional Y/C signal separation is performed with respect to a still image, while a three-dimensional Y/C signal separation with the motion estimation and compensation in the unit of the 2×2 (sample×line) block in a predetermined region of the previous frame is performed with respect to a moving image. A two-dimensional Y/C signal separation is performed with respect to the moving image whose motion is not compensated in the unit of a 2×1 (sample×line) block in the present frame.

2 Claims, 3 Drawing Sheets

N-TH FRAME (N-1)-TH FRAME

N-TH FRAME (N-1)-TH FRAME

PRESENT PIXEL (i, j)

LUMINANCE/CHROMINANCE SIGNAL SEPARATING DEVICE

BACKGROUND OF THE INVENTION

1. Field of the Invention

The present invention relates generally to image signal processing and specifically a luminance/chrominance signal separating technique utilizing motion estimation and compensation. In particular, the present invention relates to a three-dimensional (3-D) luminance/chrominance (Y/C) signal separating device which can provide a high quality image by selectively performing one of a 3-D Y/C signal separation, motion-compensated 3-D Y/C signal separation, and Y/C signal separation per block using a 2-D field comb filter in accordance with the detected image motion.

2. Description of the Prior Art

Conventionally, in the composite video signals of the National Television System Committee (NTSC) system which has been adopted in many countries in the world, the chrominance (C) signal is modulated into a chrominance subcarrier and then interleaved in spectral spaces existing between the frequency spectrums of the luminance signal so as to be compatible with black/white television signals.

In order to separate the luminance signal and the chrominance signal interleaved by the frequency multiplication in the NTSC system, a horizontal filter was first introduced, and subsequently a one-line vertical filter and a two-line vertical filter have been used as the Y/C signal separating device. Recently, a motion-compensated 3-D comb filter using frame memories has been commercialized as a large scale integrated circuit (LSI) and gradually applied to a high definition television.

The horizontal filter may be classified into a horizontal low-pass filter and a horizontal band-pass filter. In the Y/C signal separating device using the horizontal low-pass filter, the Y signal is first separated from the composite video signal through the low-pass filter to remove the low frequency band of the chrominance subcarrier, and then the separated luminance component is subtracted from the composite video signal to separate the chrominance signal.

In the Y/C signal separating device using the line vertical filter, the Y/C signal separation is performed utilizing the characteristic of the phase inversion for each line of the composite video signal.

In the Y/C signal separating device using the motion-compensated 3-D comb filter, the Y/C signal separation is performed by properly mixing the output of a 2-D Y/C signal separating filter and the output of a 3-D frame comb filter, based on the value of k which is determined by the output signal of a motion detector. For example, if the k value is "0" when no motion is detected, a 3-D Y/C signal separation is performed, while if the k value is "1" when the detected motion is great, a 2-D Y/C signal separation is performed. with respect to the intermediate values between the values "0" and "1", an adaptive Y/C signal separation is performed. In detecting the image motion, the Y component is detected by the one-frame difference value of the low frequency component of the Y signal, while the C component is detected by the difference values between the Y signal of a high frequency band and the C signals of two frames. Alternatively, the C component may be detected by the difference value between the Y signal of the high frequency band and the C signal of one frame.

According to the conventional Y/C signal separating device as described above, however, the horizontal band-pass filter provides a relatively good Y/C signal separation function in the event that a small change of image occurs in a horizontal direction, but has a drawback that the Y/C signal separation is not satisfactorily performed due to the color interference and luminance interference in the event that a large change of image occurs in the horizontal direction, thereby deteriorating a horizontal resolution of the image.

The vertical filter has a drawback that dot crawling and color interference may occur when a correlation in a vertical direction is lowered. Also, the motion-adaptive 3-D comb filter has a drawback that the motion estimation and compensation are not effectively performed, and thus the separation of the Y/C signal is inaccurately performed, thereby causing the luminance interference and color interference to occur.

SUMMARY OF THE INVENTION

It is an object of the present invention to provide a Y/C signal separating device capable of providing a high quality image by performing the Y/C signal separation in accordance with the level of image motion which is detected in the unit of a block.

In the present invention, the image motion is detected in the unit of a block, and if no motion is detected, a 3-D Y/C signal separation is performed with respect to the still image signal using a frame comb filter, while if motion is detected, motion estimation is performed in a predetermined regions of the previous frame, being based on the position of the present frame. In estimating the motion, if a coincident block exists, the 3-D Y/C signal separation is performed, while if no coincident block exists, the 2-D Y/C signal separation is performed using the 2-D field comb filter.

According to the present invention, there is provided a Y/C signal separating device includes two frame memories, a motion detecting section, a 3-D Y/C signal separating section, a motion estimation section, a motion-compensated 3-D Y/C signal separating section, and a 2-D Y/C signal separating section.

The frame memories temporarily store a digital composite video signal per frame, and the motion detecting section detects motion of a previous frame and a present frame in the unit of a block, being based on the composite video signal outputted from the frame memories, respectively, and determines whether the present frame corresponds to a still image or an image in motion.

The 3-D Y/C signal separating section performs a 3-D Y/C signal separation with respect to the still image detected by and outputted from the motion detecting section, and the motion estimation section estimates whether the image in motion can be motion-compensated or not if the present frame is detected to correspond to the image in motion by the motion detecting section.

The motion-compensated 3-D Y/C signal separating section performs a motion-compensated 3-D Y/C signal separation with respect to the image in motion if the image in motion is estimated to be able to be motion-compensated by the motion estimation section, and the 2-D Y/C signal separating section performs a 2-D Y/C signal separation in the unit of a block with respect to the image in motion if the image in motion is estimated not to be able to be motion-compensated.

BRIEF DESCRIPTION OF THE DRAWINGS

The above object, other features, and advantages of the present invention will become more apparent by describing the preferred embodiment thereof with reference to the accompanying drawings, in which.

DETAILED DESCRIPTION OF THE PREFERRED EMBODIMENT

Figure 1:
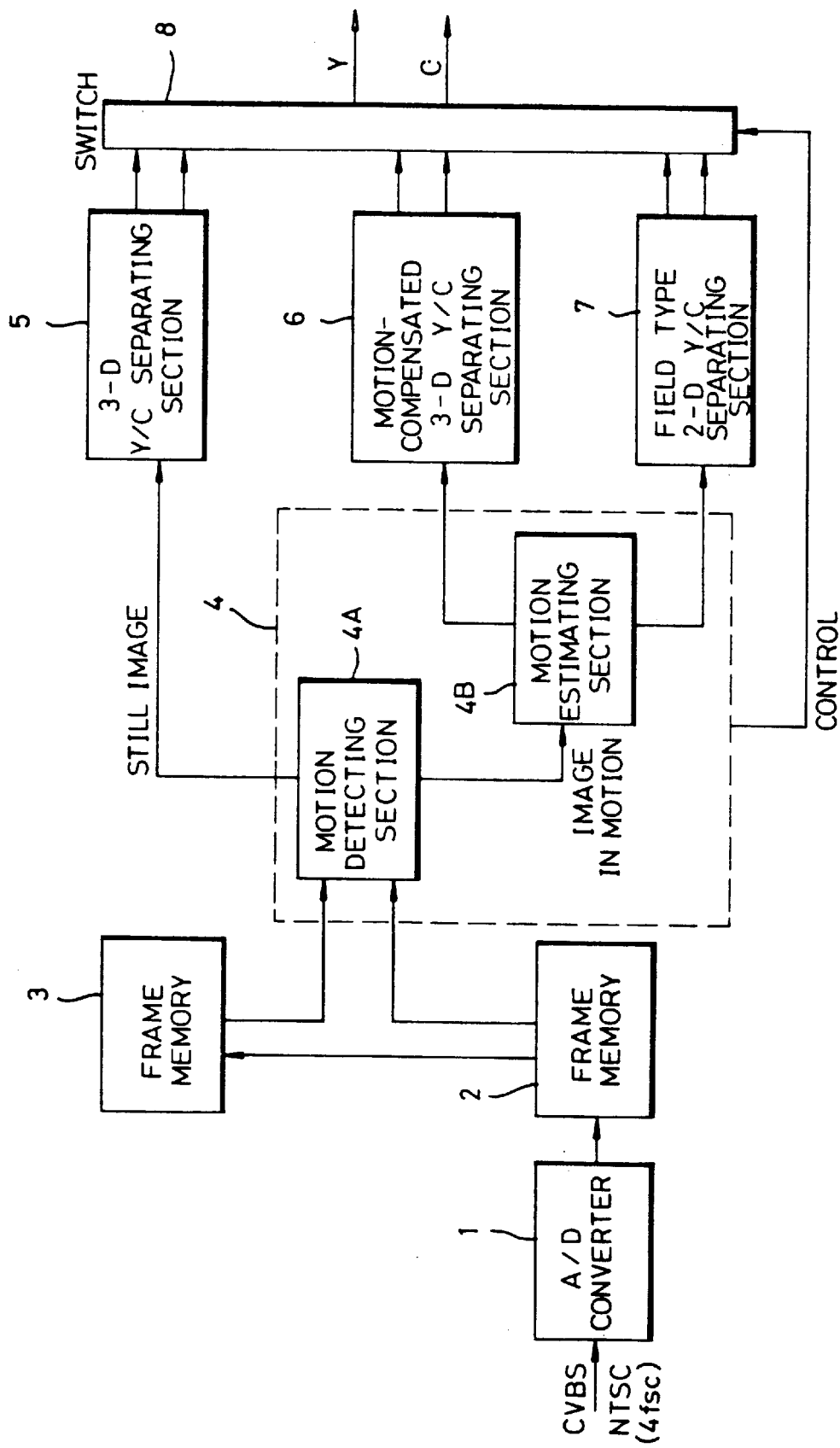
FIG. 1 is a block diagram of the Y/C signal separating device according to the present invention.

FIG. 1 is a block diagram of the 3-D Y/C signal separating device according to the present invention. Referring to FIG. 1, the device according to the present invention includes an analog-to-digital (A/D) converter 1 for converting an analog composite video signal CVBS into a digital signal, and frame memories 2 and 3 for temporarily storing an (N−1)-th frame and an N-th frame of the digital composite video signal outputted from the A/D converter 1, respectively.

A motion detecting and estimation block 4 comprises a motion detecting section 4A and a motion estimating section 4B. The motion detecting section 4A detects the motion of the previous frame and the present frame respectively outputted from the frame memories 2 and 3 in the unit of a block, and determines whether the present frame corresponds to a still image or an image in motion. The motion estimation section 4B estimates whether the image in motion can be motion-compensated or not if the present frame is detected to correspond to the image in motion by the motion detecting section 4A.

A 3-D Y/C signal separating section 5 performs a 3-D Y/C signal separation with respect to the still image detected and outputted from the motion detecting section 4A. A motion-compensated 3-D Y/C signal separating section 6 performs a motion-compensated 3-D Y/C signal separation with respect to the image in motion if the image in motion is estimated to be able to be motion-compensated by the motion estimation section 4B, and the 2-D Y/C signal separating section 7 performs a 2-D Y/C signal separation in the unit of a block with respect to the image in motion if the image in motion is estimated by the motion estimation section 4B as being incapable of motion compensation.

A switch 8 selects one of Y and C signals separated by the 3-D Y/C signal separating section 5, the motion-compensated 3-D Y/C signal separating section 6, and the field type 2-D Y/C signal separating section 7, respectively, under the control of a motion detecting and estimation block 4, and outputs the selected Y and C signals to the circuits that follow.

The operation of the Y/C signal separating device according to the present invention will be explained in detail.

The input analog composite video signal CVBS is converted into the digital signal through the A/D converter 1, and then the digital composite video signal is stored in the frame memory 2. The composite video signal read out from the frame 2 is then stored in the frame memory 3, being delayed by one frame. As a result, the frame memory 3 stores the composite video signal of the current frame (i.e., N-th frame), and the frame memory 2 stores the composite video signal of the previous frame (i.e., (N−1)-th frame).

The motion detecting section 4A detects the image motion of the two adjacent frames, i.e., the N-th frame and the (N−1)-th frame respectively outputted from the frame memories 3 and 2 in the unit of a block, and determines whether the present frame corresponds to a still image or an image in motion.

If it is determined that the present frame corresponds to the still image, it is separated into a Y signal and a C signal through the 3-D Y/C signal separating section 5. Meanwhile, if it is determined that the present frame corresponds to the image in motion, it is outputted to the motion estimation section 4B so as to estimate the motion of the image. The image in motion, which is estimated to be able to be motion-compensated, is inputted to the 3-D Y/C signal separating section 6, so that 3-D Y/C signal separation with motion compensation is performed with respect to the image in motion. The image in motion, which cannot be motion-compensated, is inputted to the field type 2-D Y/C signal separating section 7, so that 2-D Y/C signal separation in the unit of a block is performed with respect to the input image in motion.

The Y and C signals separated by the 3-D Y/C signal separating section 5, the motion-compensated Y/C signal separating section 6, and the field 2-D Y/C signal separating section 7 are selected through the switch under the control of the motion detecting and estimation block 4, and then the selected Y and C signals are outputted to the circuits that follow.

First, the operation of the motion detecting section 4A will be explained in more detail.

Motion detection is essential for the motion-adaptive 3-D Y/C signal separation. In performing the motion detection, the Y/C signal separation is performed in the unit of a pixel in such a manner that the NTSC color signal, which is locked in the color burst signal with a frequency of 4×fsc (where fsc represents the frequency of subcarrier for the color difference signal), is quantized, high-pass-filtered, and then separated into the Y and C signals by 2 or 3 lines.

Figure 2A:
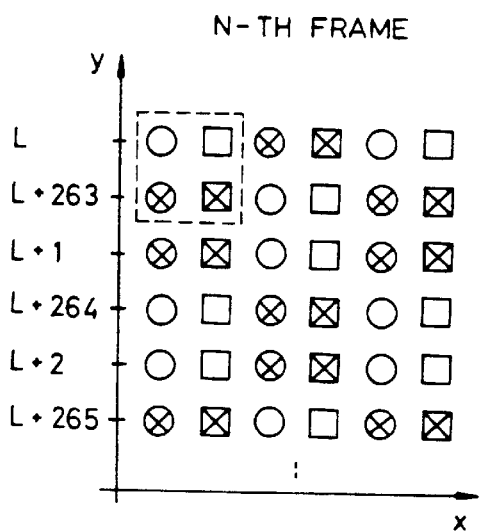
FIGS. 2A and 2B illustrate the state of the N-th and (N−1)-th frames with a sampling rate of 4×fsc according to the present invention.
Figure 2B:
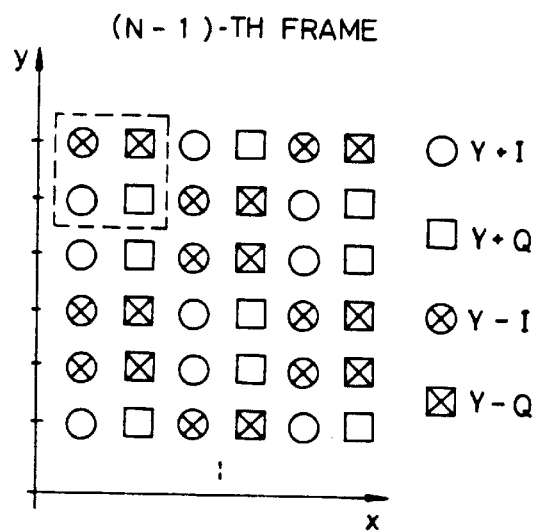

In the embodiment, the present frame and the previous frame are separated into the Y signals (Y) and C signals (I and Q), respectively, in the unit of a block which is composed of four samples sampled at a frequency of 4×fsc, and the respective Y signals Y and C signals I and Q are compared with each other. FIGS. 2A and 2B show the samples of the present frame and the previous frame, which are sampled at 4×fsc. As shown in FIGS. 2A and 2B, the phase of the sample is inverted by 180° every line, every field, and every frame, and a unit block shown as a dotted line includes 4 sample pixels.

Referring to FIGS. 2A and 2B, if it is assumed that four samples surrounded by a dotted line are to be separated into Y and C signals, the Y signal of the N-th frame is first separated in accordance with the following expression:

$$Y_n = \{(Y+I)+(Y+Q)+(Y-I)+(Y-Q)\}/4 \qquad \text{(expression 1)}$$

The C signals I and Q of the N-th frame are separated in accordance with the following expressions:

$$C1_n = I = \{(Y+I)-(Y-I)\}/2 \qquad \text{(expression 2)}$$

$$C2_n = Q = \{(Y+Q)-(Y-Q)\}/2 \qquad \text{(expression 3)}$$

Since the hue of the N-th frame is constant, it is calculated by the following expression:

$$|C_n| = \sqrt{(I^2 + Q^2)} \qquad \text{(expression 4)}$$

If the separated Y signal is within the range of the quantization level corresponding to 0-100 IRE (Institute Radio Engineer), that is, 64<Y<214, and if the separated C signal satisfies the following expression under the condition of $20.5 < |C_n| < 22.5$, $$(64 < YYI(i,j) < 214) \text{ and } (20.5 < abs(C11(i,j)) < 22.5) \qquad \text{(expression 5)}$$

the corresponding block contains the C signal. Otherwise, the corresponding block contains the Y signal. By the same method, the Y and C signals Y, I, and Q of the block of the (N−1)-th frame are separated and then compared.

The condition of the motion detection may be classified into the three following kinds.

First, if it is assumed that p×1 and p×2 are luminance or chrominance variables of the blocks of the previous and present frames, respectively, the motion detection condition will be that the block signal of the N-th frame is the Y signal "2", and the block signal of the (N−1)-th frame is the C signal "1", in accordance with the following expression:

$$cond1 = (p \times 2 = 2) \text{ and } (p \times 1 = 1) \qquad \text{(expression 6)}$$

Second, the motion detection condition will be that the block of the N-th frame is the block of the C signal, and the block of the (N−1)-th frame is the block of the Y signal, in accordance with the following expression:

$$cond2 = (p \times 2 = 1) \text{ and } (p \times 1 = 2) \qquad \text{(expression 7)}$$

Third, the motion detection condition will be that the block N-th frame is the block of the C signal, the block of the (N−1)-th frame is the block of the C signal, and the variable values of the C signals I and Q are more than the value of k, in accordance with the following expression:

$$\begin{aligned} cond3 = & \\ (p \times 2 = 1) \text{ and } (p \times 1 = 1) & \text{ and } [abs(Cd(i, j)) > k, \\ \text{or } abs(Cd(i+1, j)) > k, & \text{ or } abs(Cd(i, j+1)) > k, \\ & \text{or } abs(Cd(i+1, j=1)) > k] \end{aligned} \qquad \text{(expression 8)}$$

Now, the operation of the 3-D Y/C signal separating section 5 for performing the 3-D Y/C signal separation with respect to the still image will be explained in more detail.

If no motion is detected, the image is deemed to be a still image, and the 3-D Y/C signal separation is performed using the four sample blocks of the N-th frame and those of the (N−1)-th frame. The condition for the still image will be that both the N-th frame and the (N−1)-th frame correspond to the Y signal, or if both the N-th frame and the (N−1)-th frame correspond to the C signal, then the value of k is less than "10".

Figure 3A:
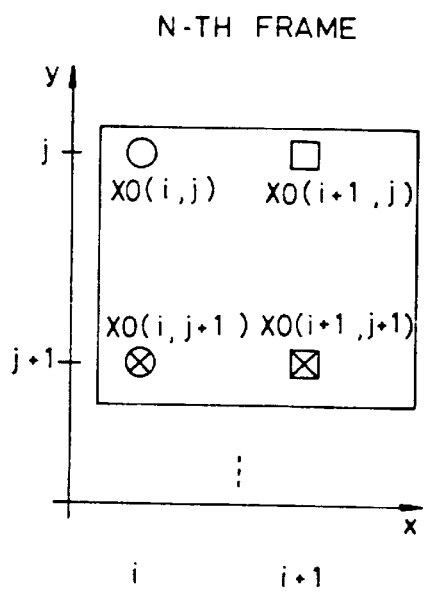
FIGS. 3A and 3B illustrate the state of the N-th and (N−1)-th frames for explaining the Y/C signal separating function with respect to a still image according to the present invention.
Figure 3B:
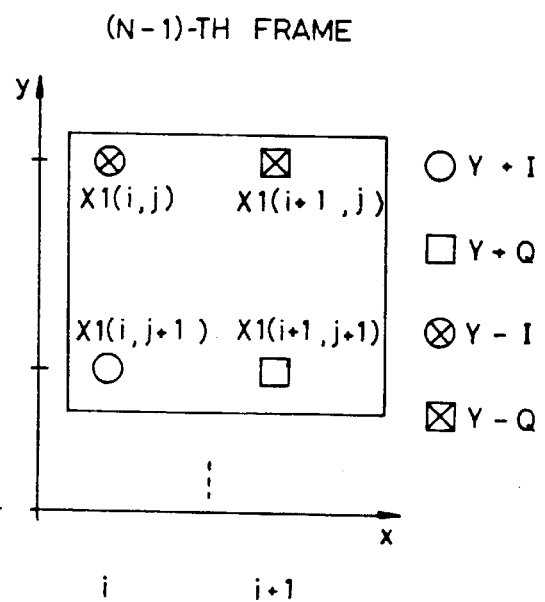

In performing the 3-D Y/C signal separation, as shown in FIGS. 3A and 3B, if it is assumed that X0 is the composite video signal of the N-th frame, and X1 is the composite video signal of the (N−1)-th frame, the Y signal of the j-th line is separated from the present N-th frame and the previous (N−1)-th frame, in accordance with the following expression:

$$Y(i,j) = \{(X0(i,j) + X1(i,j))/2\} \qquad \text{(expression 9)}$$

Also, the j-th C signal and the (i+1)-th C signal are separated in accordance with the following expressions;

$$C(i,j) = Ij = \{X0(i,j) - Y(i,j)\} \qquad \text{(expression 10)}$$

$$C(i+1,j) = Qj = \{X0(i+1,j) - Y(i,j)\} \qquad \text{(expression 11)}$$

By the same method, the Y and C signals of the (j+1)-th line are separated. The 3-D Y/C signal separation as described above can eliminate the color interference phenomenon.

Next, the operation of the motion-compensated 3-D Y/C signal separating section 6 will be explained in more detail.

The motion-compensated 3-D Y/C signal separating section 6 adopts the motion estimation technique which is one of the coding methods for effectively transmitting video signals. Specifically, the motion-compensated 3-D Y/C signal separating section 6 performs the 3-D Y/C signal separation with respect to the NTSC type composite video signal by motion estimation and motion compensation utilizing a block matching method which is a type of region matching method.

The size of a block is preferably determined so that a block is composed of two lines in a vertical direction and one pixel (one sample) in a horizontal direction. If the size of the block is determined to be larger than that as above, a blocking effect is generated. Also, the search for motion between frames for the motion estimation is generally performed in the range of about ±7 pixels in the horizontal direction and in the range of about ±4 lines in the vertical direction.

Figure 4:
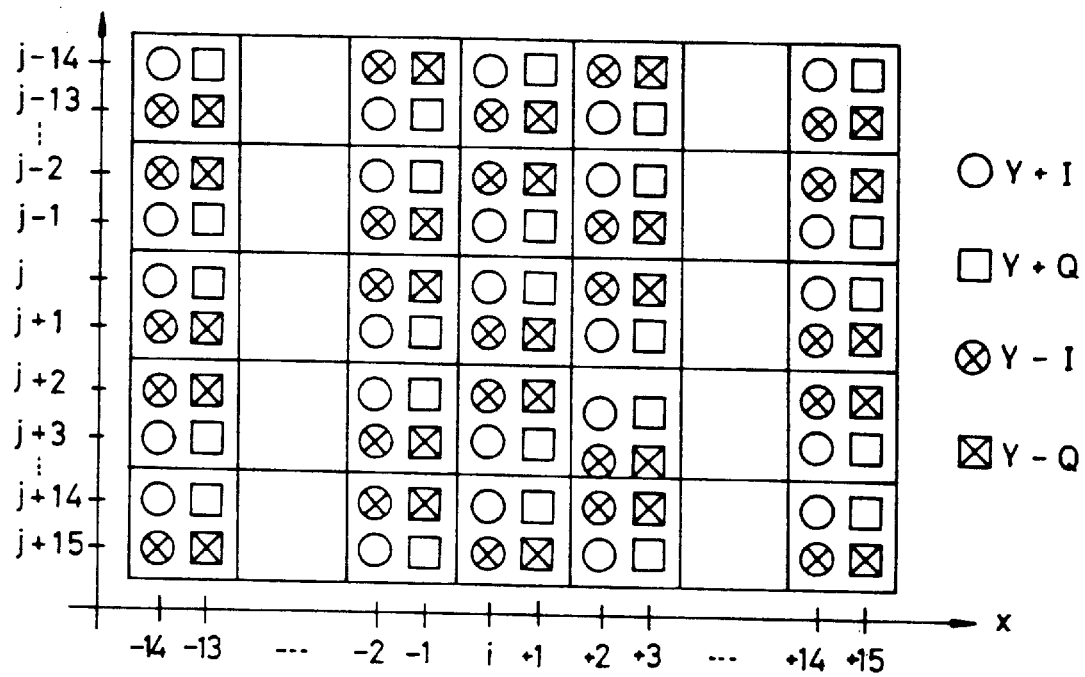
FIG. 4 illustrates the Y/C signal separation range of the (N−1)-th frame according to the present invention.

According to the simulation experiment according to the present invention, a full search method was adopted as the motion search method, and the search was made in the range of ±7 blocks in the horizontal direction and of ±7 blocks in the vertical direction. FIG. 4 shows the range of the motion estimation utilized in the experiment according to the present invention.

Referring to FIG. 4, the block composed of four samples (i, j), (i+1, j), (i, j+1), and (i+1, j+1) in the (N−1)-th frame has an inverted phase with respect to the corresponding block composed of four samples (i, j), (i+1, j), (i, j+1), and (i+1, j+1) of the N-th frame, but has the same phase as the adjacent block composed of four samples (i+2, j), (i+3, j), (i+2, j+1), and (i+3, j+1). Accordingly, with respect to the block having the same phase in the (N−1)-th frame, the absolute value of the color difference is obtained by the following expression:

$$abs(C_n(i,j) - C_{n-1}(i,j)) \qquad \text{(expression 12)}$$

$$abs(C_n(i+1,j) - C_{n-1}(i+1,j))$$

With respect to the block having the inverted phase, the color difference is obtained by the following expression:

$$abs(C_n(i,j) + C_{n-1}(i,j)) \qquad \text{(expression 13)}$$

$$abs(C_n(i+1,j) + C_{n-1}(i+1,j))$$

Also, the luminance difference is obtained by the following expression:

$$abs(Y_n(i,j) + Y_{n-1}(i,j)) \qquad \text{(expression 14)}$$

If the luminance difference and the color difference is less than 5 and 1, respectively, it is determined that the blocks are the same. Specifically, if the block of the previous (N−1)-th frame, which is determined to be the same block as the present N-th frame, has the inverted phase, the motion-compensated 3-D Y/C signal separation is performed in accordance with the expressions 9 to 11. If the block of the previous frame has the same phase, the motion-compensated Y/C signal separation is performed in accordance with the expressions 9–11, considering the j-th line of the present frame as the (j+1)-th line of the previous frame, and considering the (j+1)-th line of the present frame as the j-th line of the previous line.

Lastly, the operation of the 2-D Y/C signal separating section 7 for performing the 2-D Y/C signal separation using a field comb filter will be explained in more detail.

Figure 5:
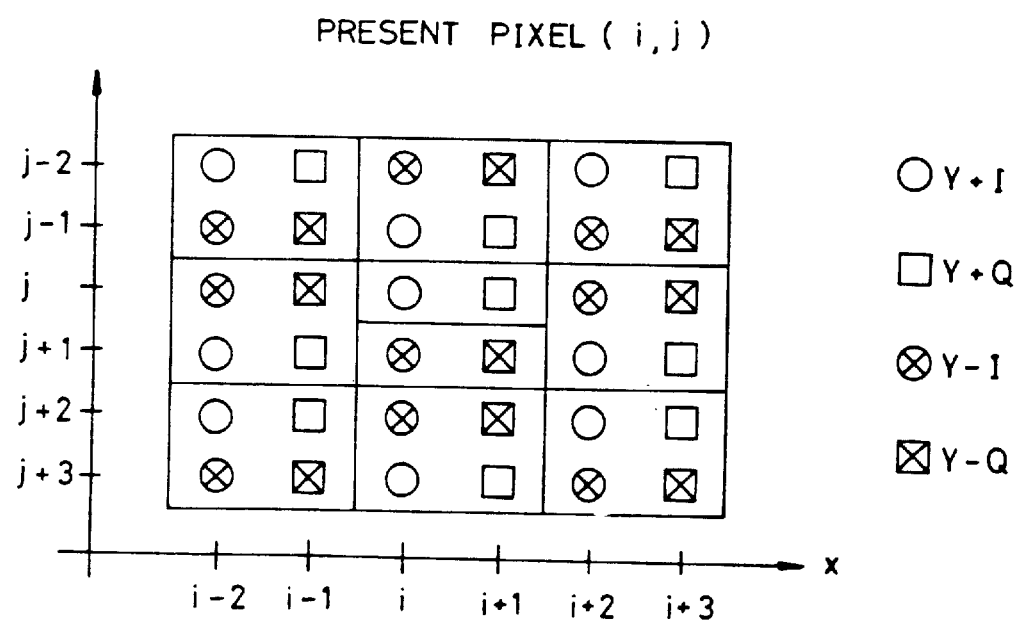
FIG. 5 illustrates the state of the field type 2-D Y/C signal separation according to the present invention.

In the event that the 3-D Y/C signal separation cannot be performed by the motion estimation and the motion compensation, the 2-D Y/C signal separation is performed in accordance with the expressions 1 to 3, using a field correlation between the j-th and (j+1)-th lines of the present N-th frame, as shown in FIG. 5. Further, the 2-D Y/C signal separation may be performed by a correlation-adaptive 2-D Y/C signal separating filter.

In conclusion, according to the present invention, the image motion is detected in the unit of a 2×2 (sample×line) block to separate the NTSC type television signal into the Y and C signals. If no motion is detected, the 3-D Y/C signal separation is performed with the motion estimation and compensation in the unit of a 2×2 (sample×line) block in the predetermined region of the previous frame. With respect to the image portions whose motion has not been estimated, the field 2-D Y/C signal separation is performed in the unit of a 2×1 (sample×line) block in the present frame.

In implementing the prefered embodiment of the present invention, the increase in the memory has been given less consideration since price of the semiconductor memory employed therein decreases steadily according to advances in the semiconductor manufacturing techniques. The present invention may adopt a tree step search for motion in place of the full search for motion estimation as described above for practicality.

From the foregoing, it will be apparent that the present invention provides the advantages in that it can provide a high quality image by selectively performing one of the 3-D Y/C signal separation, motion-compensated 3-D Y/C signal separation, and 2-D Y/C signal separation in accordance with the image motion detected in the unit of a block.

While the present invention has been described and illustrated herein with reference to the preferred embodiment thereof, it will be understood by those skilled in the art that various changes in form and details may be made therein without departing from the spirit and scope of the invention.

What is claimed is:

1. A luminance/chrominance (Y/C) signal separating device comprising:
   a memory for temporarily storing an input composite video signal;
   a motion detecting section for detecting a motion of a previous image and a present image in the unit of a predetermined block, based on the composite video signal outputted from the memory, and determining whether the present image corresponds to a still image or a moving image;
   a three-dimensional Y/C signal separating section for performing a three-dimensional Y/C signal separation with respect to the still image if the present image is detected to correspond to the still image by the motion detecting section, the three-dimensional Y/C signal separating section performing the three-dimensional Y/C signal separation utilizing a four-sample block of the present image and a corresponding four-sample block of the previous image;
   a motion estimation section for estimating whether or not the moving image can be motion-compensated if the present image is detected to correspond to the moving image by the motion detecting section;
   a motion-compensated three-dimensional Y/C signal separating section for performing a motion-compensated three-dimensional Y/C signal separation with respect to the moving image if the motion estimation section estimates that the moving image can be motion-compensated; and
   a two-dimensional Y/C signal separating section for performing a two-dimensional Y/C signal separation with respect to the moving image if the motion estimation section estimates that the moving image cannot be motion-compensated.

2. A luminance/chrominance (Y/C) signal separating device comprising:
   a memory for temporarily storing an input composite video signal;
   a motion detecting section for detecting a motion of a previous image and a present image in the unit of a predetermined block, based on the composite video signal outputted from the memory, and determining whether the present image corresponds to a still image or a moving image;
   a three-dimensional Y/C signal separating section for performing a three-dimensional Y/C signal separation with respect to the still image if the present image is detected to correspond to the still image by the motion detecting section, the motion-compensated three-dimensional Y/C signal separating section performing the three-dimensional Y/C signal separation by motion-estimating and motion-compensating the composite video signal utilizing a block matching method wherein the size of the block is determined so that it is composed of two lines in a vertical direction and one pixel in a horizontal direction;
   a motion estimation section for estimating whether or not the moving image can be motion-compensated if the present image is detected to correspond to the moving image by the motion detecting section;
   a motion-compensated three-dimensional Y/C signal separating section for performing a motion-compensated three-dimensional Y/C signal separation with respect to the moving image if the motion estimation section estimates that the moving image can be motion-compensated; and
   a two-dimensional Y/C signal separating section for performing a two-dimensional Y/C signal separation with respect to the moving image if the motion estimation section estimates that the moving image cannot be motion-compensated.

* * * * *